(12) United States Patent
Mori et al.

(10) Patent No.: US 9,124,082 B2
(45) Date of Patent: Sep. 1, 2015

(54) POWER CABLE TERMINATION FOR AERIAL CONNECTION AND PROCESS FOR PRODUCING POWER CABLE TERMINATION FOR AERIAL CONNECTION

(75) Inventors: Anna Mori, Shinagawa-ku (JP); Takahiro Sakurai, Shinagawa-ku (JP); Shozo Kobayashi, Shinagawa-ku (JP)

(73) Assignees: VISCAS CORPORATION, Tokyo (JP); FUJIKURA LTD., Tokyo (JP); FURUKAWA ELECTRIC Co., LTD., Tokyo (JP)

( * ) Notice: Subject to any disclaimer, the term of this patent is extended or adjusted under 35 U.S.C. 154(b) by 448 days.

(21) Appl. No.: 13/500,970

(22) PCT Filed: Oct. 5, 2010

(86) PCT No.: PCT/JP2010/067405
§ 371 (c)(1),
(2), (4) Date: Apr. 9, 2012

(87) PCT Pub. No.: WO2011/043313
PCT Pub. Date: Apr. 14, 2011

(65) Prior Publication Data
US 2012/0193142 A1    Aug. 2, 2012

(30) Foreign Application Priority Data
Oct. 9, 2009  (JP) ................................ 2009-234742

(51) Int. Cl.
*H02G 15/064*      (2006.01)

(52) U.S. Cl.
CPC ......... *H02G 15/064* (2013.01); *Y10T 29/49204* (2015.01)

(58) Field of Classification Search
USPC .......................................................... 174/73.1
See application file for complete search history.

(56) References Cited

U.S. PATENT DOCUMENTS

| 6,652,433 B1* | 11/2003 | Ishikawa et al. ................ 492/56 |
| 7,361,836 B2* | 4/2008 | Goehlich .................... 174/74 R |
| 8,715,533 B2* | 5/2014 | Takagi et al. ................. 252/511 |
| 2002/0160209 A1* | 10/2002 | Cottevieille et al. .......... 428/447 |
| 2004/0209025 A1 | 10/2004 | Kobayashi et al. |

(Continued)

FOREIGN PATENT DOCUMENTS

| CN | 1926737 A | 3/2007 |
| CN | 201113370 Y | 9/2008 |
| CN | 201252384 Y | 6/2009 |

(Continued)

OTHER PUBLICATIONS

International Search Report Issued Nov. 30, 2010 in PCT/JP10/67405 Filed Oct. 5, 2010.

(Continued)

*Primary Examiner* — Chau N Nguyen
(74) *Attorney, Agent, or Firm* — Oblon, McClelland, Maier & Neustadt, L.L.P.

(57) ABSTRACT

A power cable termination for aerial connection houses an end of a power cable and a conductor extension rod connected to an end of a conductor of the cable in a bushing. The bushing is filled with an insulating filler. The insulating filler is composed of any one of: (1) a mixture of a silicone oil and a silicone rubber; (2) a mixture of a silicone oil and a silicone gel; and (3) a mixture of silicone oil, a silicone rubber and a silicone gel.

16 Claims, 3 Drawing Sheets

(56) References Cited

U.S. PATENT DOCUMENTS

| | | |
|---|---|---|
| 2005/0167431 A1 | 8/2005 | Stora |
| 2009/0166084 A1* | 7/2009 | Mirebeau et al. ............. 174/650 |

FOREIGN PATENT DOCUMENTS

| | | |
|---|---|---|
| JP | 59-120437 | 7/1984 |
| JP | 6-107806 | 4/1994 |
| JP | 6-508715 | 9/1994 |
| JP | 6 80338 | 11/1994 |
| JP | 9 275611 | 10/1997 |
| JP | 11 66975 | 3/1999 |
| JP | 2004 15945 | 1/2004 |
| JP | 2006-042421 | 2/2006 |
| JP | 3769046 | 4/2006 |
| JP | 2007-053105 | 3/2007 |
| JP | 2008-92783 | 4/2008 |
| RU | 2 365 012 C2 | 8/2009 |
| TW | 200423510 A | 11/2004 |
| WO | WO-2005/076426 * | 8/2005 |

OTHER PUBLICATIONS

Combined Taiwanese Office Action and Search Report issued Oct. 4, 2013 in Patent Application No. 099134216 (with partial English language translation).

Office Action issued Nov. 20, 2013 in Canadian Patent Application No. 2,777,287.

International Preliminary Report on Patentability issued May 15, 2012 in Application No. PCT/JP2010/067405 (English Translation).

International Preliminary Report on Patentability issued Apr. 11, 2012 in Application No. PCT/JP2010/067405 (English Translation).

Written Opinion issued Nov. 30, 2010 in International Application No. PCT/JP2010/067405 (With English Translation).

Office Action issued Dec. 4, 2013 in Russian Application No. 2012118697 (with English translation)

Canadian Office Action issued Aug. 14, 2014 in Patent Application No. 2,777,287.

Chinese Search Report issued Jun. 23, 2014, in China Patent Application No. 201080040312.5.

Office Action issued Feb. 12, 2015, in Chinese Patent Application No. 201080040312.5 (with English translation).

Office Action issued Feb. 17, 2015, in Japanese Patent Application No. 2011-535390 (with English translation).

Office Action issued Apr. 16, 2015 in Canadian Patent Application No. 2,777,287.

Office Action issued Apr. 28, 2015 in Japanese Patent Application No. 2010-216755 (with English translation).

* cited by examiner

POWER CABLE TERMINATION FOR AERIAL CONNECTION AND PROCESS FOR PRODUCING POWER CABLE TERMINATION FOR AERIAL CONNECTION

FIELD OF THE INVENTION

The present invention relates to a power cable termination for aerial connection configured to house an end of a power cable in a bushing filled with an insulating filler, and a process for producing the power cable termination.

DESCRIPTION OF RELATED ART

For the purpose of terminating an end of a power cable, that is, providing a power cable termination for aerial connection (referred to as "termination", hereinafter), generally required when the power cable such as CV cable (crosslinked polyethylene insulated PVC sheathed cable) is connected to power equipment installed at a power plant or the like or to aerial transmission line, there has been known a structure configured to house an end of the power cable in a bushing filled with an oil (so-called, oil-immersed termination). Since the oil-immersed termination is anticipated to pollute the ambient environment if oil leakage should occur, a dry-type termination which discuses oil has been desired.

One of known dry-type terminations has a sheath made of epoxy resin or silicone rubber configured to surround a conductor element (Patent Document 1, for example). The technique described in Patent Document 1 successfully provides the dry-type termination. However, the technique additionally requires a large die for molding the sheath made of epoxy resin or silicone rubber. This pushes up the initial investment, the cost of conductor element, and consequently the cost of termination.

Another known dry-type termination uses a silicone gel in place of the oil (Patent Document 2, for example). The termination described in Patent Document 2 only needs injection of a raw material of silicone gel before being cured, in place of the oil, into the bushing, simply followed by curing for gelation. The same structures for the oil-immersed termination (such as bushing, or stress cone) can be used for adoptable herein same as those used.

PRIOR ART DOCUMENT

Patent Document

Patent Document 1: Japanese Examined Patent Publication No. 3769046
Patent Document 2: Japanese Laid-Open Utility Publication No. H06-80338

DISCLOSURE OF THE INVENTION

Problems to be Solved by the Invention

In the process of filling up the bushing with the insulating filler such as silicone gel, it is most important to prevent a gap from being formed between the insulating filler and various components such as power cable, bushing, or rubber stress cone.

In the oil-immersed termination, because the insulating filler is a fluid (oil), a gap between the insulating filler and the power cable and so forth will not be formed and the insulating filler per se will not crack, even after being exposed to repetitive heat expansion and heat shrinkage.

On the other hand, in the termination disclosed in Patent Document 2, having silicone gel used for the insulating filler, may cause partial separation between the insulating filler and the power cable and so forth and a gap may be formed, or the insulating filler per se may crack after being exposed to repetitive heat expansion and heat shrinkage. Therefore, anxieties in the durability and reliability still remain. As described in the above, also the termination using silicone gel as the insulating filler still suffers from the drawbacks. This is the reason why the oil-immersed termination is still in the mainstream, despite that the necessity of dry-type termination not causative of environmental impact has well been understood.

The present invention aims at solving the above-described subjects. An object of the present invention is to provide a dry-type power cable termination for aerial connection and a process for producing the power cable termination, capable of ensuring excellent durability and reliability even under an environment with variable temperature, and of reducing the manufacturing cost.

Means for Solving the Subjects

According to a first aspect of the present invention, there is provided a power cable termination for aerial connection configured to house an end of a power cable and a conductor extension rod connected to an end of a conductor of the cable in a bushing, and configured to fill the bushing with an insulating filler,
wherein the insulating filler is composed of any one of:
(1) a mixture of a silicone oil and a silicone rubber;
(2) a mixture of a silicone oil and a silicone gel; and
(3) a mixture of silicone oil, a silicone rubber and a silicone gel.

Since the insulating filler filled in the bushing of the power cable termination for aerial connection has an excellent interfacial adherence, and is expected to be self-repairable even if the above-described separation or cracks should occur, a gap between the insulating filler and the power cable and so forth is less likely to produce in the termination, even after being exposed to repetitive heat expansion and heat shrinkage during use in an environment with variable temperature. Accordingly, a dry termination excellent in the durability and reliability can be implemented by the present invention. The termination of the invention is configured similarly to the conventional oil-immersed termination except for the configuration of the insulating filler, and can therefore be manufactured at low costs. Unlike the oil-immersed termination, the termination of the invention is not causative of oil leakage.

According to a second aspect of the present invention, there is provided a process for producing a power cable termination for aerial connection configured to house an end of a power cable and a conductor extension rod connected to an end of a conductor of the cable in a bushing, and configured to fill the bushing with an insulating filler,
the method including:
any one of:
(1) mixing a silicone oil and a raw material of silicone rubber;
(2) mixing a silicone oil and a raw material of silicone gel; or
(3) mixing a silicone oil, a raw material of silicone rubber and a raw material of silicone gel, and
filling any one of the mixture into the bushing just when the power cable termination for aerial connection is assembled. According to the invention, the insulating filler formed herein has an excellent interfacial adherence and self-restoring of the insulating filler will be expected even when the interfaces between the insulating filler and the power cable and so forth are separated. The termination is less likely to produce any gap between the insulating filler and the power cable and so forth, even after being exposed to repetitive heat expansion and heat shrinkage during use in an environment with variable temperature. Accordingly, a dry-type termination excellent in the durability and reliability can be implemented by the invention. The termination of the invention is configured similarly to the conventional oil-immersed termination except for the configuration of the insulating filler, and can therefore be manufactured at low costs. Unlike the oil-immersed termination, there is no anticipation of oil leakage.

According to a third aspect of the present invention, there is provided the process for producing a power cable termination for aerial connection according to the second aspect, wherein the mass ratio of the silicone oil to the raw material of silicone rubber ranges from 9:1 to 20:1.

According to the invention, the interfacial adherence or the like of the insulating filler is appropriately adjusted, and thereby the termination having still higher levels of durability and reliability can be implemented.

According to a fourth aspect of the present invention, there is provided the process for producing a power cable termination for aerial connection according to the second aspect, wherein the mass ratio of the silicone oil and the raw material of silicone gel ranges from 2:8 to 7:3.

According to the invention, the interfacial adherence or the like of the insulating filler can appropriately be adjusted, and thereby the termination having still higher levels of durability and reliability can be implemented.

According to a fifth aspect of the present invention, there is provided the process for producing a power cable termination for aerial connection according to any one of the second to fourth aspects of the present invention, wherein the silicone oil has a viscosity of 3000 cst to 30000 cst.

According to the invention, the interfacial adherence or the like of the insulating filler can appropriately be adjusted, and thereby the termination having still higher levels of durability and reliability can be implemented. In addition, the silicone oil will have an appropriate viscosity, and thereby workability (handleability) in the process of assembling the termination can be improved.

According to a sixth aspect of the present invention, there is provided the process for producing a power cable termination for aerial connection according to the second aspect, wherein the raw material of silicone rubber or the raw material of silicone gel, and the silicone oil, respectively contained in separate containers, are brought into a site of assemblage of the power cable termination for aerial connection, mixed at the site of assemblage, and then the mixture is filled into the bushing.

According to the invention, the raw material of silicone rubber or the raw material of silicone gel, and the silicone oil are injected into the bushing while being appropriately mixed, and thereby a desired type of insulating filler can readily be formed.

In the present invention, the silicone rubber or the silicone gel can be either of the two-part type and one-part type. In this specification, the term "raw material" in conjunction with the two-part silicone rubber or silicone gel means a base and a hardener, whereas the term in conjunction with the one-part silicone rubber or silicone gel means a liquid silicone rubber or silicone gel before being cured.

Effect of the Invention

According to the present invention, a dry-type power cable termination for aerial connection and a process for producing the power cable termination, capable of ensuring excellent durability and reliability even under an environment with variable temperature, and of reducing the manufacturing cost, can be provided.

DESCRIPTION OF THE PREFERRED EMBODIMENTS

Embodiments of the present invention will be detailed below, referring to the attached drawings.

Figure 1:
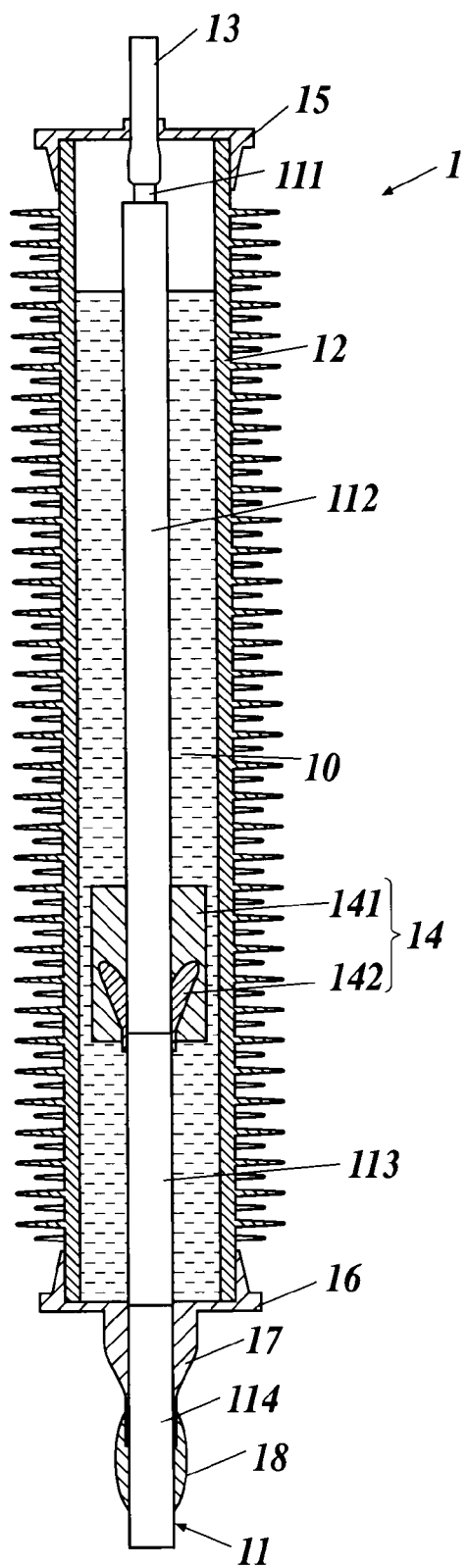
FIG. 1 This is a sectional view illustrating an overall configuration of a termination according to one embodiment.

FIG. 1 is a sectional view illustrating an overall configuration of a termination according to one embodiment. As seen in FIG. 1, a power cable 11 is a rubber- or resin-insulated power cable (typically CV cable). The power cable 11 has a conductor 111, an insulating layer 112 formed on the periphery of the conductor 111, an external semi-conductive layer 113 formed on the periphery of the insulating layer 112, and a shield layer (not illustrated) and a sheath 114, each formed on the periphery of the external semi-conductive layer 113. The individual layers are exposed by multi-level stripping at predetermined lengths. An electro-conductive conductor extension rod 13 is connected to an end of the conductor 111.

A rubber stress cone 14 is attached on the outer circumferential surface of the power cable 11 and extends across the external semi-conductive layer 113 and the insulating layer 112. The rubber stress cone 14 is contractive at normal temperature. The rubber stress cone 14 is configured by a semi-conductive rubber component 142 for moderating an electric field, and an insulating rubber component 141. The rubber stress cone 14 is tightly brought into contact with the outer circumferential surface of the power cable 11, by a contractive force generated as a result of radial expansion caused by the power cable 11.

The bushing 12 is a composite bushing configured typically by a hollow cylinder made of a fiber-reinforced plastic (FRP), covered with a finned casing made of rubber or plastic. The upper and lower openings of the bushing 12 are closed by an upper metal attachment 15 attached to the top and a lower metal attachment 16 attached to the bottom, to thereby form therein a small vacancy for housing the end of the power cable 11. The lower metal attachment 16 has a lower copper tube 17 for holding the power cable 11. The lower copper tube 17 extends from the lower metal attachment 16. A seal 18 is provided at an end of the lower copper tube 17 (the bottom end in FIG. 1). The seal 18 prevents an insulating filler 10 from leaking.

The conductor extension rod 13 connected to the end of conductor 111 of the power cable 11 projects through the upper metal attachment 15 out into the external. The small vacancy formed by the bushing 12, the upper metal attachment 15 and the lower metal attachment 16 is filled with the insulating filler 10. In other words, the termination 1 is configured by housing the end of the power cable 11, and the conductor extension rod 13 connected to the end of the conductor of the cable 12 in the bushing 12, and filling the insulating filler in the bushing 12.

In this embodiment, the insulating filler 10 filled in the bushing 12 is configured by any one of: a mixture of silicone oil and a silicone rubber; a mixture of silicone oil and a silicone gel; and a mixture of a silicone oil, a silicone rubber and a silicone gel. These insulating fillers 10 are manufactured by mixing a raw material of silicone rubber or a raw material of silicone gel into a silicone oil, as described later.

Raw materials of silicone rubber are commercially available in the form of liquid. They cure by polymerization reaction. The raw materials are classified into those of one-part type and two-part type, and are also roughly classified, based on the types of reaction, into those based on addition reaction and condensation reaction. The addition-type silicone rubber may preferably be used, since the raw materials of condensation-type silicone rubber may react with moisture in the air.

Commercially available silicone rubbers include SE6910 from Dow Corning Toray Co., Ltd. for example. This silicone rubber is of two-part type, containing vinyl-group-containing organopolysiloxane as a base and hydrogen organopolysiloxane as a hardener, a cured product of which shows a hardness of 9 when measured using a type-A durometer.

Also raw materials of silicone gel are commercially available in the form of liquid, similarly to those of the silicone rubber. The raw materials are allowed to cure by polymerization reaction to thereby give gels. The raw materials are classified into those of one-part type and two-part type, and are also roughly classified, based on the types of reaction, into those based on addition reaction and condensation reaction. The addition-type silicone gel may preferably be used, since the raw materials of condensation-type silicone gel may react with moisture in the air.

Commercially available silicone gels include SE1886 from Dow Corning Toray Co., Ltd. for example. This silicone gel is of two-part type, containing vinyl-group-containing organopolysiloxane as a base and hydrogen organopolysiloxane as a hardener, a cured product of which shows a consistency of 50.

Note that the silicone rubber herein means a cured silicone product, the hardness of which is measurable using the type-A durometer specified in JIS K6253, when cured without being mixed with silicone oil. On the other hand, the silicone gel herein means a cured silicone product, the hardness of which is not measurable using the type-A durometer. The above-described JIS K6253 corresponds to ISO 7619.

The silicone oil is a component having no polymerization reactivity, unlike the silicone rubber and the silicone gel. While either of commercially-available straight silicone oils and modified silicone oils are adoptable, the straight silicone oils are more preferably used. SH200 from Dow Corning Toray Co., Ltd. is one of commercially-available straight silicone oils.

The straight silicone oils herein mean silicone oils configured by straight-chain polymers built up by siloxane bonds. Three species, which include dimethylsilicone oil (having methyl groups for all of side chains and terminals of polysiloxane), methyl phenyl silicone oil (having phenyl groups for a part of side chains of polysiloxane), and methyl hydrogen silicone oil (having hydrogen atoms for a part of side chains of polysiloxane), are generally called "straight silicone oils". On the other hand, the modified silicone oils herein mean those having organic groups introduced into the side chains or terminals thereof, and are roughly classified into four structures (side chain-modified type, both terminal-modified type, single terminal-modified type, and side chain/both terminal-modified type), depending on site of bonding of organic groups to be substituted. They are also classified into reactive silicone oils and non-reactive silicone oils, depending on properties of the organic groups to be introduced.

Viscosity of the silicone oil is preferably 3000 to 30000 cst (measured in compliance with JIS K7117-2), but not specifically limited. By using the silicone oil having the viscosity in the above-described range, workability (handleability) of the silicone oil, in the process of manufacturing of the insulating filler 10 by mixing it with the raw material of silicone rubber or the raw material of silicone gel, may be improved, and interfacial adherence of the resultant gel (of the insulating filler 10) may be excellent. Note that JIS K7117-2 corresponds to ISO 3219.

In the process of manufacturing the insulating filler 10 by mixing the silicone oil and the raw material of silicone rubber, the mass ratio of the silicone oil to the raw material of silicone rubber is preferably adjusted to 9:1 to 20:1. By adjusting the ratio in the above-described range, the insulating filler 10 having a desired level of interfacial adherence is implemented, and thereby the durability and reliability of the termination 1 under an environment with variable temperature are improved.

On the other hand, in the process of manufacturing the insulating filler 10 by mixing the silicone oil and the raw material of silicone gel, the mass ratio of the silicone oil to the raw material of silicone gel is preferably adjusted to 2:8 to 7:3. By adjusting the ratio in the above-described range, the insulating filler 10 having a desired level of interfacial adherence is implemented, and thereby the durability and reliability of the termination 1 under an environment with variable temperature are improved.

In the process of manufacturing the insulating filler 10 by mixing the silicone oil, the raw material of silicone rubber, and the raw material of silicone gel, the mass ratio of them is preferably adjusted to a ratio possibly achieved by mixing the mixture of the silicone oil and the raw material of silicone rubber based on the above-described ratio, with the mixture of silicone oil and the raw material of silicone gel based on the above-described ratio. By adjusting the ratio in the above-described range, the insulating filler 10 having a desired level of interfacial adherence is implemented, and thereby the durability and reliability of the termination 1 under an environment with variable temperature are improved.

The insulating filler 10 may be added with arbitrary component(s), without adversely affecting the operations and effects of the present invention. Examples of the arbitrary components include reaction inhibitor, reaction accelerator, inorganic filler, flame retarder, thixotropy promoting agent, pigment and dye.

In the process of assembling the termination 1 illustrated in FIG. 1, a predetermined amount of the raw material (base and hardener, for the case of two-part type) of silicone rubber (or silicone gel), and a predetermined amount of the silicone oil, respectively contained in separate containers, are brought into a site of assemblage. The lower copper tube 17 and the lower metal attachment 16 are attached to the end of the multi-level-stripped power cable 11, the rubber stress cone 14 is then attached, and the conductor extension rod 13 is connected to the end of the conductor 111. The bushing 12 is attached so as to cover the end of the power cable 11, and fixed on the lower metal attachment 16 in a fluid-tight manner. The seal 18 is further provided so as to extend across the power cable 11 and the lower copper tube 17.

In the process of manufacturing of the insulating filler 10, a void possibly produced on the surface of the stress cone 14 may be reduced, by preliminarily coating the silicone oil on the surface of the stress cone 14.

The liquid-form raw material of silicone rubber (or silicone gel) and the silicone oil are then placed into one container according to a predetermined ratio, and mixed at normal temperature until the content becomes uniform. For the case where the silicone rubber (or silicone gel) is of two-part type composed of a base and a hardener, the hardener comes last. The raw material of silicone rubber (or silicone gel) and the silicone oil are mixed typically by using a hand mixer.

Next, a predetermined amount of the mixture of the raw material of silicone rubber (or silicone gel) and the silicone oil is injected into the small vacancy formed by the bushing 12 and the lower metal attachment 16, the mixture is debubbled, and the upper metal attachment 15 is attached to close the small vacancy. Current is then supplied to the power cable 11 while keeping the internal of the small vacancy at normal temperature, and the mixture is allowed to stand for curing over a predetermined time, to thereby form the insulating filler 10. The insulating filler 10 is given in a form of soft gel (having a consistency of 200 to 420, when measured in compliance with JIS K2220 using a standard corn as a measurement terminal). Note that JIS K2220 (using a standard corn as a measurement terminal) corresponds to ISO 2137 (using a conical cone as a measurement terminal).

Example 1

In Example 1, using gels obtained by mixing the silicone oils and the raw material of silicone rubber, and then curing the mixtures, the consistency according to JIS K2220, the durability and reliability through a heat cycle test, interfacial adherence, and void filling time were evaluated. Products of SH200 Series from Dow Corning Toray Co., Ltd. (commercially available in various viscosity levels) were used as the silicone oils, and SE6910 from Dow Corning Toray Co., Ltd. (liquid type, pre-curing viscosity=7500 cst) was used as the raw material of silicone rubber.

The ratio of the silicone oils and the raw material of silicone rubber was varied in the range from 8:1 to 21:1, as listed in Table 1. The viscosity of the silicone oils used herein varied in the range from 1000 to 40000 cst as listed in Table 1. The individual samples were subjected to the heat cycle test, and also the interfacial adherence and the void filling time were investigated. Results are shown in Table 1.

mixed at the site of assemblage, 30 kg of the resultant mixture was injected into the bushing 12, and then cured to produce a gel, that is, the insulating filler 10. The thus-assembled termination 1 was subjected to the heat cycle test.

More specifically, the mixture of each silicone oil and the silicone rubber was cured, and was exposed to a heat cycle between (at normal temperature, for 16 hours) and (at a conductor temperature of 90° C., for 8 hours), repeated ten times. After completion of the heat cycle test, the upper metal attachment 15 was detached, and the bushing 12 was looked into through the top opening, in order to visually observe the insulating filler 10. The insulating filler 10 was evaluated from the viewpoint of presence or absence of separation or gap between the insulating filler 10 and the power cable 11 or the bushing 12.

The insulating filler 10 was evaluated as "○" if no separation was observed between itself and the outer surface of the power cable 11 or the inner surface of the bushing 12, even when the surface of the insulating filler 10 was pushed with a bar; evaluated as "Δ" if instant separation was observed between itself and the outer surface of the power cable 11 or the inner surface of the bushing 12, when the surface of the insulating filler 10 was pushed with a bar; and evaluated as "x" if a gap was observed between itself and the outer surface of the power cable 11 or the inner surface of the bushing 12. In other words, evaluation "○" represents that the insulating filler 10 kept the close contact with the power cable 11 and the bushing 12 without causing separation throughout the heat cycle test, and evaluation "Δ" represents that the insulating filler 10 separated from the power cable 11 or the bushing 12 during the heat cycle test to thereby degrade the close contact, showing a trace of separation as a consequence (but no gap observed). Evaluation "x" represents not only that the insulating filler 10 separated from the power cable 11 or the bushing 12 in the heat cycle test to thereby degrade the close contact, but also that the gap was observed. Evaluation "x" was, however, not observed in any of Examples 1, 2 and Comparative Example.

The interfacial adherence test was conducted using a test piece of each gel, produced by placing the mixture of a silicone oil and the raw material of silicone rubber between two sheets and then by allowing it to gel. More specifically,

TABLE 1

| | | | Example 1 | | | | | | | |
|---|---|---|---|---|---|---|---|---|---|---|
| | | | 1-1 | 1-2 | 1-3 | 1-4 | 1-5 | 1-6 | 1-7 | 1-8 |
| Silicone oil:silicone rubber | | | 9:1 | 12:1 | 20:1 | 20:1 | 8:1 | 20:1 | 20:1 | 21:1 |
| Silicone oil viscosity [cst] | | | 3000 | 3000 | 3000 | 30000 | 3000 | 1000 | 40000 | 30000 |
| Consistency | | | 282 | 325 | 375 | 380 | 220 | 260 | 398 | ≧450 |
| Heat cycle test | | | ○ | ○ | ○ | ○ | Δ | Δ | ○ | ○ |
| Interfacial adherence | XLPE | Adherence [Mpa] | 0.65 | 0.71 | 0.87 | 1.21 | 0.53 | 0.55 | 1.50 | 2.20 |
| | | Residence of gel | Δ | ○ | ○ | ○ | Δ | ○ | ○ | ○ |
| | EP | Adherence [Mpa] | 0.85 | 1.03 | 1.52 | 1.88 | 0.72 | 0.89 | 2.70 | 3.10 |
| | | Residence of gel | Δ | ○ | ○ | ○ | Δ | ○ | ○ | ○ |
| Void filling time | | | 3 h | 45 min | 30 min | 30 min | 12 h | 6 h | 30 min | 15 min |

The heat cycle test was conducted using an assembled termination 1. More specifically, an end of a 66-kV power cable having a conductor size of 500 sq, and an insulator thickness of 10 mm was housed in a 110-kV-class polymer bushing 12 (inner diameter=290 mm, height=1350 mm). Each silicone oil and the raw material of silicone rubber were the mixture of the silicone oil and the raw material of silicone rubber was placed between two sheets each having a size of 20 mm×100 mm×1 mm, allowed to cure between the sheets, and the sheets were then slid while keeping them in parallel under a 0.5 kg load applied from the top. The adherence was evaluated based on the force (adhesive force) resistive to the sliding, and also based on residence of the gel or oil component on the sheets. The interfacial adherence was evaluated respectively for the cases where the crosslinked polyethylene (XLPE) sheets were used, and where the ethylene propylene rubber (EP) sheets were used. Evaluation "○" represents that the gel was found to reside both of two sheets; evaluation "Δ" represents that the gel was found to reside on one sheet and an oil component on the other sheet; and evaluation "x" represents that the gel was found to reside only on one sheet (nothing, including the oil component, was found to reside on the other sheet).

The void filling time was measured using samples each prepared by placing 15 ml of the mixture of the silicone oil and the raw material of silicone rubber into a 20-ml, screw-capped tube, and by allowing the mixture to cure. Each sample was pushed from the top with a needle of 0.5 mm diameter to a depth of 20 mm, and the time over which the thus-formed pinhole disappears was measured.

The void filling time helps estimation of tendency of filling of the gap, produced when the insulating filler 10 separates from the power cable 11 or the bushing 12, with the leached silicone oil. It is therefore understood that the shorter the void filling time would be, the more rapidly the gap would be filled (repaired), even if the gap should occur as a result of separation between the insulating filler 10 from the power cable 11 or the bushing 12.

As shown in Table 1, in Example 1-2, the silicone oil and the raw material of silicone rubber were mixed at the ratio of 12:1. The mixture showed a post-curing consistency of 325. In Example 1-3, the mixture mixed at the ratio of 20:1 showed a post-curing consistency of 375. Both of the Examples had an Silicone oil viscosity of 3000 cst. Both of them showed good results in the heat cycle test and the interfacial adherence test. It is supposed that, since the void filling time is 45 min or shorter, the gaps in these Examples were successfully repaired within short times by the leached silicone oil, even if the gaps should occur between the insulating filler 10 and the power cable 11 or the bushing 12.

In Example 1-1, the silicone oil (viscosity=3000 cst) and the raw material of silicone rubber were mixed at the ratio of 9:1. The mixture showed a post-curing consistency of 282, the interfacial adherence smaller than those in Examples 1-2, 1-3, but a good result in the heat cycle test. Since the void filling time was found to be 3 h, so that the gap is supposed to be repaired by the leached silicone oil, even if the gap should occur between the insulating filler 10 and the power cable 11 or the bushing 12.

In Example 1-5, the silicone oil (oil viscosity=3000 cst) and the raw material of silicone rubber were mixed at the ratio of 8:1. The mixture showed a post-curing consistency of 220, the interfacial adherence smaller than those in Examples 1-2, 1-3, and the trace of separation observed in the heat cycle test. Since the void filling time was found to be 12 h, so that the gap is supposed to be repaired by the leached silicone oil, even if the gap should occur between the insulating filler 10 and the power cable 11 or the bushing 12.

It is therefore supposed that the interfacial adherence degrades if the ratio of the silicone oil reduces, and the post-curing consistency of the insulating filler 10 reduces (becomes harder), and the durability and reliability (represented by the results of the heat cycle test) under an environment with variable temperature degrade as a consequence. It is also understood that, the smaller the consistency will be, the longer the void filling time will be.

From the viewpoint of durability and reliability under an environment with variable temperature, the ratio of the silicone oil to the raw material of silicone rubber in the mixture is preferably adjusted to 9:1 or larger. It is to be noted that if the ratio of the silicone oil to the raw material of silicone rubber is as large as 8:1, an oil film may be formed at the interface between the insulating filler 10 and the power cable 11 or the bushing 12, causing no gap in between and no electrical problem, proving practical applicability of the insulating filler 10.

In Example 1-4, the silicone oil (oil viscosity=30000 cst) and the raw material of silicone rubber were mixed at the ratio of 20:1. The mixture showed a post-curing consistency of 380. In Example 1-7, the silicone oil (oil viscosity=40000 cst) and the raw material of silicone rubber were mixed at the ratio of 20:1. The mixture showed a post-curing consistency of 398. Both of the post-curing consistencies were equivalent to, or larger than that in Example 1-3. Also good results were obtained in the heat cycle test and the interfacial adherence test. The both showed a void filling time of 30 min, equivalent to that in Example 1-3.

Example 1-7, however, needed a longer time for assemblage of the termination 1, since the oil viscosity was too large, so that the oil did not readily flow in the process of decantation for mixing of the silicone oil and the raw material of silicone rubber, and stirring for mixing the silicone oil with the raw material of silicone rubber was labor-consuming.

In Example 1-6, the silicone oil (oil viscosity=1000 cst) and the raw material of silicone rubber were mixed at the ratio of 20:1. The mixture showed a post-curing consistency of 260, which was smaller (harder) than that in Example 1-3 (oil viscosity=3000 cst). While the interfacial adherence test showed a good result, the heat cycle test showed a trace of separation. An oil film was formed at the interface between the insulating filler 10 and the power cable 11 or the bushing 12, causing no gap in between and no electrical problem in practical applicability of the insulating filler 10. The void filling time was found to be 6 h, which was longer than that in Example 1-3.

Figure 2:
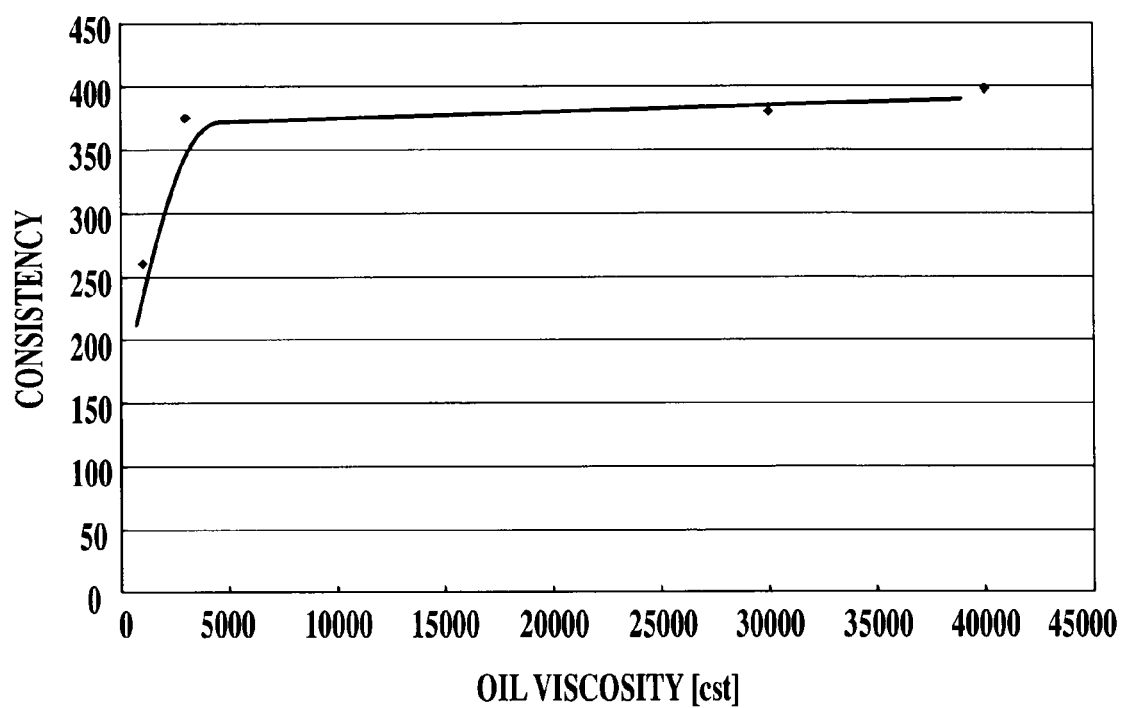
FIG. 2 This is a graph illustrating a relation between viscosity of silicone oil used in manufacturing, and consistency of the resultant insulating filler.

FIG. 2 is a drawing illustrating a relation between the oil viscosity and the post-curing consistency of the mixture when the ratio of the silicone oil to the raw material of silicone rubber is 20:1. Curiously enough, as seen in FIG. 2, the viscosity of the silicone oil and the hardness (consistency) of the resultant insulating filler are in a relation opposite to what is to be expected. That is, the larger the viscosity of the silicone oil would be, the softer the insulating filler would be (the larger the consistency would be), whereas the smaller the viscosity of the silicone oil would be, the harder the insulating filler would be (the smaller the consistency would be).

As seen in FIG. 2, the consistency of the insulating filler 10 is stabilized at high levels, when the viscosity of the silicone oil to be mixed with is 3000 or larger. On the other hand, if the oil viscosity is smaller than 3000 cst, the consistency sharply decreases (the insulating filler 10 becomes harder), and the insulating filler 10 will be more likely to separate from the power cable 11 or the bushing 12 ("Δ" in the heat cycle test). This also reduces the effect of filling of the gap produced in between (the void filling time becomes longer). On the other hand, too large consistency of the insulating filler 10 (excessively soft) may make the insulating filler 10 more likely to leak from the bushing 12, and may raise an additional need of sophisticating the seal 18.

Judging from the above, from the viewpoint of durability and reliability under an environment with variable temperature, and of workability in the process of assemblage, the viscosity of the silicone oil is preferably 3000 cst or larger and 30000 cst or smaller.

In Example 1-8, the silicone oil (oil viscosity=30000 cst) and the raw material of silicone rubber were mixed at the ratio of 21:1. The mixture showed a post-curing consistency of 400 or larger, apparently larger than that in Example 1-3. Good results were obtained also in the heat cycle test and in the interfacial adherence test. However, curing of the mixture in the process of assemblage took a longer time (the mixture cured within 5 days at 25° C. in other Examples 1-1 to 1-7, but it took 8 days in Example 1-8).

For the case where the mixture of the silicone oil and the raw material of silicone rubber takes a long time for curing, the mixture is anticipated to leak out from the bushing 12, unless otherwise the seal 18 is sophisticated. It is therefore necessary to set the ratio of the silicone oil to the raw material of silicone rubber smaller than 21:1.

As judged from the results of Examples 1-1 to 1-8, the ratio of the silicone oil to the raw material of silicone rubber is preferably adjusted in the range from 9:1 to 20:1, when the insulating filler 10 is produced by mixing the silicone oil with the raw material of silicone rubber. The viscosity of the silicone oil to be mixed with is preferably 3000 to 30000 cst.

Example 2

In Example 2, gels are obtained by: mixing the silicone oils and the raw material of silicone gel; and then curing the mixtures. The gels were used for evaluating the consistency according to JIS K2220, the durability and reliability through the heat cycle test, interfacial adherence, and void filling time, similarly as described in Example 1.

Products of SH200 Series from Dow Corning Toray Co., Ltd. were used as the silicone oils. SE1886 from Dow Corning Toray Co., Ltd. (pre-curing viscosity=1122 cst) was used as the raw material of silicone gel. The ratio of the silicone oils to the raw material of silicone gel in the mixture was varied in the range from 1:9 to 8:2. Examples of results of evaluation are shown in Table 2.

TABLE 2

| | | | Example 2 | | | |
|---|---|---|---|---|---|---|
| | | | 2-1 | 2-2 | 2-3 | 2-4 |
| Silicone oil:silicone gel | | | 2:8 | 7:3 | 1:9 | 8:2 |
| Oil viscosity [cst] | | | 3000 | 3000 | 3000 | 3000 |
| Consistency | | | 280 | 395 | 250 | ≥400 |
| Heat cycle test | | | ○ | ○ | Δ | ○ |
| Interfacial adherence | XLPE | Adherence [Mpa] | 1.55 | 2.10 | 1.20 | 2.83 |
| | | Residence of gel | ○ | ○ | ○ | ○ |
| | EP | Adherence [Mpa] | 2.65 | 3.05 | 1.98 | 3.62 |
| | | Residence of gel | ○ | ○ | ○ | ○ |
| Void filling time | | | 45 min | 30 min | 1 h | 30 min |

As shown in Table 2, in Example 2-1, the silicone oil (oil viscosity=3000 cst) and the raw material of silicone rubber were mixed at the ratio of 2:8. The mixture showed a post-curing consistency of 280. In Example 2-2, the silicone oil (oil viscosity=3000 cst) and the raw material of silicone rubber were mixed at the ratio of 7:3. The mixture showed a post-curing consistency of 395. Both of them showed good results in the heat cycle test and the interfacial adherence test. It is supposed that, since the void filling time is 45 min or shorter, the gaps in these Examples were successfully repaired within short times by the leached silicone oil, even if the gaps should occur between the insulating filler 10 and the power cable 11 or the bushing 12.

In Example 2-3, the silicone oil (oil viscosity=3000 cst) and the raw material of silicone rubber were mixed at the ratio of 1:9. The mixture showed a post-curing consistency of 250, which was lower (harder) than those in Examples 2-1, 2-2. While the interfacial adherence was found to be good, a trace of separation was observed in the heat cycle test. An oil film was found to be formed at the interface between the insulating filler 10 and the power cable 11 or the bushing 12, causing no gap in between and no electrical problem. The void filling time was found to be 1 h, which was slightly longer than those in Examples 2-1, 2-2.

As judged from the above, also in the process of manufacturing the insulating filler 10 by mixing the silicone oil and the raw material of silicone gel, the interfacial adherence degrades if the mixing ratio of the silicone oil reduces and the post-curing consistency of the insulating filler 10 reduces (becomes harder). As a consequence, the durability and reliability (represented by the results of the heat cycle test) under an environment with variable temperature degrade. It is also understood that, the smaller the consistency will be, the longer the void filling time will be.

From the viewpoint of durability and reliability under an environment with variable temperature, the ratio of the silicone oil to the raw material of silicone gel in the mixture is preferably adjusted to 2:8 or larger.

In Example 2-4, the silicone oil (oil viscosity=3000 cst) and the raw material of silicone rubber were mixed at the ratio of 8:2. The mixture showed a post-curing consistency of 400 or larger, apparently larger (softer) than those in Examples 2-1, 2-2. Good result were obtained also in the heat cycle test and in the interfacial adherence test. The void filling time was found to be 30 min, equivalent to that in Example 2-2. Curing of the mixture in the process of assemblage, however, took a long time.

For the case where the mixture of the silicone oil and the raw material of silicone gel takes a long time for curing, the mixture is anticipated to leak out from the bushing 12, unless otherwise the seal 18 is sophisticated. It is therefore necessary to set the ratio of the silicone oil to the raw material of silicone gel smaller than 8:2.

As judged from the results of Examples 2-1 to 2-4, the ratio is preferably adjusted in the range from 2:8 to 7:3, when the insulating filler 10 is produced by mixing the silicone oil with the raw material of silicone gel. The viscosity of the silicone oil to be mixed with is preferably 3000 to 30000 cst, similarly as described in Example 1.

Taking the results of the heat cycle test described in Examples 1 and 2, and the time required for the curing of the mixture into consideration, the post-curing consistency is preferably 280 to 398.

Comparative Example

In Comparative Example, a gel is obtained by curing a commercially available silicone gel (JCR6110, from Dow Corning Toray Co., Ltd.) alone. The gel was used for evaluating the consistency according JIS K2220, the durability and reliability through the heat cycle test, interfacial adherence, and void filling time, similarly as described in Example 1. Results are shown in Table 3.

TABLE 3

| | Comparative Example |
|---|---|
| Silicone gel | 1 |
| Oil viscosity [cst] | — |

TABLE 3-continued

|  |  |  | Comparative Example |
| --- | --- | --- | --- |
| Consistency |  |  | 225 |
| Heat cycle test |  |  | Δ |
| Interfacial adherence | XLPE | Adherence [Mpa] | 0.65 |
|  |  | Residence of gel | x |
|  | EP | Adherence [Mpa] | 0.82 |
|  |  | Residence of gel | x |
| Void filling time |  |  | >48 h |

As shown in Table 3, in Comparative Example, the insulating filler 10 was manufactured using the silicone gel alone. The insulating filler 10 showed a post-curing consistency of 225, and also showed results of the heat cycle test and interfacial adherence apparently degraded from those in Examples 1, 2. Voids in Comparative Example did not disappear even after the elapse of 48 hours. The interfacial adherence was found to be inferior to that in Example 1-5 adopting an equivalent level of post-curing consistency. The fact was enough to prove an efficacy of using the mixture of the silicone rubber or the silicone gel with the silicone oil, in the formation of the insulating filler 10.

From the results of Examples 1, 2 and Comparative Example, it is understood that the interfacial adherence of the insulating filler 10 with the various components, including the power cable 11, the bushing 12 and the stress cone 14, may be improved more largely by manufacturing it by using the mixture of the silicone oil with the silicone rubber or with the silicone gel according to the present invention, as compared with the case where the insulating filler 10 is manufactured by using, without modification, a commercially available material preliminarily given in the form of silicone gel.

The insulating fillers 10 manufactured in Examples 1, 2 were found to be less likely to produce gaps at the interface between the insulating filler 10 and the power cable 11 and so forth, and were understood as self-repairable (capable of filling the gaps) within a short time even if the separation should occur at the interface.

The present inventors suppose reasons for the phenomenon as below. The commercially-available silicone gel has a uniform composition over the entire portion thereof, and the insulating filler 10 obtainable by curing the composition consequently has a uniformly cross-linked structure over the entire portion thereof. In contrast, according to the present invention, the mixture is obtained by mixing the raw material of silicone rubber or the raw material of silicone gel with the silicone oil. The mixture is filled into the bushing 12, while leaving therein local non-uniformity in the composition in a microscopic view. The insulating filler 10 obtained by curing this sort of mixture shows a non-uniform distribution of cross-linkage (locally dense and locally scarce), and exhibits only a limited degree of constraint on molecules of the silicone oil. As a consequence, the gap is less likely to occur at the interface between the insulating filler 10 and the power cable 11 and so forth, and thereby the separation, even if should occur at the interface, may be self-repaired within a short time.

As described in the above, in the termination 1 of the embodiment, the insulating filler 10 is composed of the mixture of the silicone oil and the silicone rubber, or the mixture of the silicone oil and the silicone gel.

Accordingly, the insulating filler 10 filled in the bushing 12 shows an excellent interfacial adherence, and also exhibits a self-repairing function to be exerted on the separated portion. The termination 1 is therefore less likely to produce a gap between the insulating filler 10 and the power cable 11 and so forth, even when the insulating filler is repetitively exposed to heat expansion and heat shrinkage under an environment with variable temperature. The dry-type termination 1 excellent in the durability and reliability is thus implemented. The termination 1 is configured similarly to the conventional oil-immersed termination except for the configuration of the insulating filler 10, and may therefore be manufactured at low costs. Unlike the oil-immersed termination, there is no anticipation of oil leakage.

The present invention was explained in the above, referring to the specific embodiments. The present invention is, however, not limited to the above-described embodiments, and may be modified without departing from the scope thereof.

For example, the insulating filler to be filled in the bushing may be a product obtained by mixing the mixture of the raw material of silicone rubber and the silicone oil (Example 1-1, for example) with the mixture of the raw material of silicone gel and the silicone oil (Example 2-1, for example).

Figure 3:
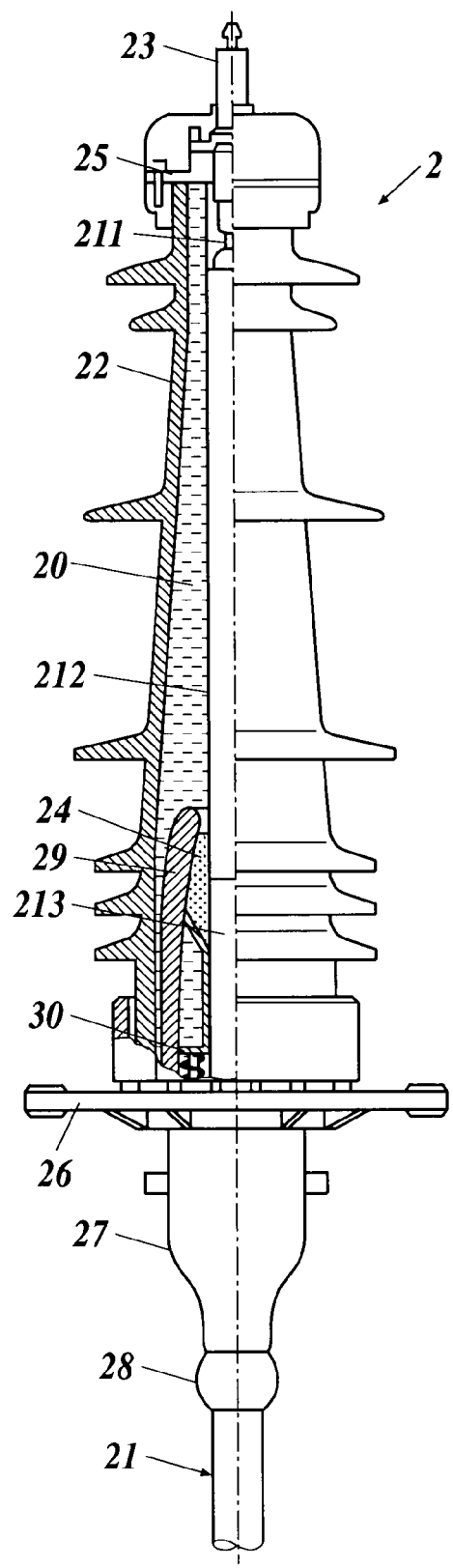
FIG. 3 This is a sectional view illustrating another exemplary termination.

The present invention is also adoptable to a termination having a structure different from that of the above-described embodiments. FIG. 3 is a drawing illustrating another exemplary termination applied with the present invention. In a termination 2 illustrated in FIG. 3, a stress cone 24 made of rubber is attached so as to be pressed against an insulating layer 212 and an external semi-conductive layer 213 of a power cable 21, with the aid of an epoxy base 29 and a compression device 30.

In other words, also the termination 2 is configured, similarly to the termination 1 in the above-described embodiment, to house an end of the power cable 21, and a conductor extension rod 23 connected to an end of a conductor 211 of the power cable 21 in a bushing 22, and configured to fill the bushing 22 with an insulating filler 20. The insulating filler 20 is composed of: the raw material of silicone gel and/or the raw material of silicone rubber; and the silicone oil.

It is to be understood that the embodiments disclosed herein are merely for exemplary purposes in every aspect, and are not limitative at all. The scope of the present invention is defined by the appended claims rather than by the description in the above, and is therefore intended to embrace any modifications which have equivalent meaning or fall within the scope of the present invention.

Explanation of the Marks 1 power cable termination for connection
10 insulating filler
11 power cable
111 conductor
112 insulating layer
113 external semi-conductive layer
12 bushing
13 conductor extension rod
14 rubber stress cone
142 semi-conductive rubber component
141 insulating rubber component
15 upper metal attachment
16 lower metal attachment
17 lower copper tube
18 seal

What is claimed is:

1. A power cable termination for aerial connection to house an end of a power cable and a conductor extension rod connected to an end of a conductor of the cable in a bushing, comprising:
an insulating filler to fill the bushing, wherein the insulating filler is comprised of a gel cured in the bushing, and the gel is a cured product of any one of:
(1) a mixture of a silicone oil having no polymerization reactivity and a liquid-form raw material of a silicone rubber, wherein a mass ratio of the silicone oil to the raw material of silicone rubber ranges from 9:1 to 20:1;
(2) a mixture of a silicone oil having no polymerization reactivity and a liquid-form raw material of a silicone gel, wherein a mass ratio of the silicone oil to the raw material of the silicone gel ranges from 2:8 to 7:3; and
(3) a mixture of silicone oil having no polymerization reactivity, a liquid-form raw material of a silicone rubber, and a liquid-form raw material of a silicone gel
wherein at least one of
a mass ratio of the silicone oil to the raw material of silicone rubber ranges from 9:1 to 20:1 and
a mass ratio of the silicone oil to the raw material of the silicone gel ranges from 2:8 to 7:3.

2. The power cable termination for aerial connection according to claim 1, wherein the silicone oil has a viscosity of 3000 cst to 30000 cst.

3. The power cable termination for aerial connection according to Claim 1, wherein the mass ratio of the silicone oil to the raw material of silicone gel ranges from 2:8 to 1:1.

4. The power cable termination for aerial connection according to Claim 1, wherein the silicone oil is a straight silicone oil configured by straight-chain polymers built up by siloxane bands.

5. The power cable termination for aerial connection according to Claim 1, wherein the silicone oil includes at least one of:
dimethylsilicone oil,
methyl phenyl silicone oil, and
methyl hydrogen silicone oil.

6. The power cable termination for aerial connection according to Claim 1, wherein the silicone oil is a modified silicone oil having organic groups introduced into the side chains or terminals thereof.

7. The power cable termination for aerial connection according to Claim 1, wherein the silicone oil includes at least one of:
a side chain-modified type;
a both terminal-modified type;
a single terminal-modified type; and
a side chain/both terminal-modified type.

8. A process for producing a power cable termination for aerial connection to house an end of a power cable and a conductor extension rod connected to an end of a conductor of the cable in a bushing, and to fill the bushing with an insulating filler, the process comprising:
any one of:
(1) mixing a silicone oil having no polymerization reactivity and a liquid-form raw material of silicone rubber wherein a mass ratio of the silicone oil to the raw material of silicone rubber ranges from 9:1 to 20:1,
(2) mixing a silicone oil having no polymerization reactivity and a liquid-form raw material of silicone gel, wherein a mass ratio of the silicone oil to the raw material of the silicone gel ranges from 2:8 to 7:3, and
(3) mixing a silicone oil having no polymerization reactivity, a liquid-form raw material of silicone rubber, and a liquid-form raw material of silicone gel wherein at least one of
a mass ratio of the silicone oil to the raw material of silicone rubber ranges from 9:1 to 20:1 and
a mass ratio of the silicone oil to the raw material of the silicone gel ranges from 2:8 to 7:3;
filling any one of the mixture into the bushing just when the power cable termination for aerial connection is assembled; and
curing the filled mixture.

9. The process for producing a power cable termination for aerial connection according to claim 8, wherein the silicone oil has a viscosity of 3000 cst to 30000 cst.

10. The process for producing a power cable termination for aerial connection according to claim 8, further comprising:
bringing a container in which the raw material of silicone rubber or the raw material of silicone gel are contained, and another container in which the silicone oil is contained, into a site of assemblage of the power cable termination for aerial connection, mixed at the site of assemblage, and then the mixture is filled into the bushing.

11. The process for producing a power cable termination for aerial connection according to Claim 8, wherein the mass ratio of the silicone oil to the raw material of silicone gel ranges from 2:8 to 1:1.

12. The process for producing a power cable termination for aerial connection according to claim 8, further comprising:
attaching a rubber stress cone to the end of the power cable housed by the bushing; and
coating the silicone oil on a surface of the stress cone prior to the filling any one of the mixture into the bushing to reduce a possibility of a void being produced on the surface of the stress cone.

13. The process for producing a power cable termination for aerial connection according to Claim 8, wherein the silicone oil is a straight silicone oil configured by straight-chain polymers built up by siloxane bands.

14. The process for producing a power cable termination for aerial connection according to claim 8, wherein the silicone oil includes at least one of:
dimethylsilicone oil,
methyl phenyl silicone oil, and
methyl hydrogen silicone oil.

15. The process for producing a power cable termination for aerial connection according to Claim 8, wherein the silicone oil is a modified silicone oil having organic groups introduced into the side chains or terminals thereof.

16. The process for producing a power cable termination for aerial connection according to Claim 8, wherein the silicone oil includes at least one of:
a side chain-modified type;
a both terminal-modified type;
a single terminal-modified type; and
a side chain/both terminal-modified type.

* * * * *